United States Patent
Fleming, Jr. et al.

[15] 3,660,222
[45] May 2, 1972

[54] FILLING MATERIAL OF POLYESTER FIBERS

[72] Inventors: David Alexander Fleming, Jr., Wilmington; Gilbert Douglas Rawlings, Hockessin, both of Del.

[73] Assignee: E. I. du Pont de Nemours and Company, Wilmington, Del.

[22] Filed: Apr. 1, 1969

[21] Appl. No.: 811,819

[52] U.S. Cl. ............................ 161/156, 156/295, 161/157, 161/166, 161/170
[51] Int. Cl. .............................. B32b 5/14, B32b 5/28
[58] Field of Search ............. 161/152, 156, 157, 164, 166, 161/169, 170

[56] References Cited

UNITED STATES PATENTS

| | | |
|---|---|---|
| 3,461,026 | 8/1969 | Schick ........................... 161/156 X |
| 3,449,486 | 6/1969 | Contractor et al. ............. 161/170 X |
| 3,373,455 | 3/1968 | Kaplan ........................... 161/152 X |
| 2,949,394 | 8/1960 | Rodman ......................... 161/156 X |
| 2,980,570 | 4/1961 | Cook et al. ..................... 161/152 X |

*Primary Examiner*—Robert F. Burnett
*Assistant Examiner*—Mark A. Litman
*Attorney*—Howard P. West, Jr.

[57] ABSTRACT

A filling material of polyester fibers is formed by garnetting staple length fibers to a web then spraying a resinous bonding agent on the web and curing the resin to bond the constituent fibers. The resin is present in diminishing quantities through the web from one face to the other. A plurality of such webs may be used to form a layered structure which has a high degree of filling support weight along with a desirable degree of softness.

2 Claims, 7 Drawing Figures

PATENTED MAY 2 1972

*INVENTORS*
DAVID ALEXANDER FLEMING JR.
GILBERT DOUGLAS RAWLINGS

BY *Howard P. West Jr.*
ATTORNEY

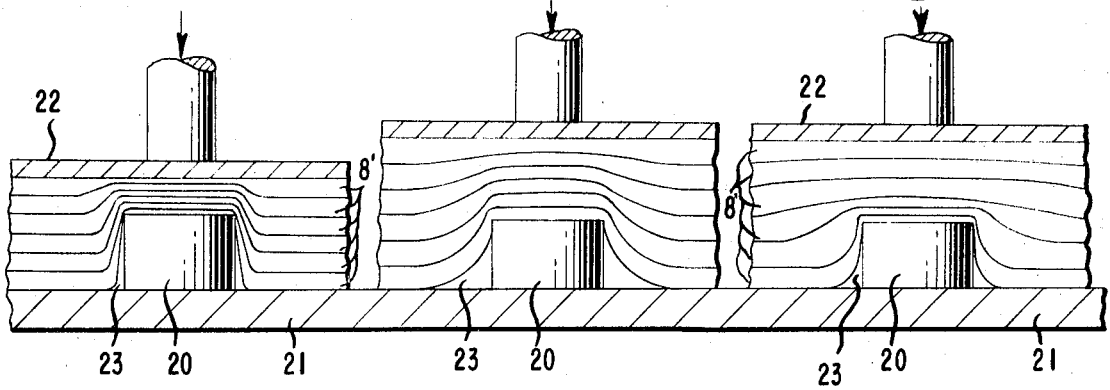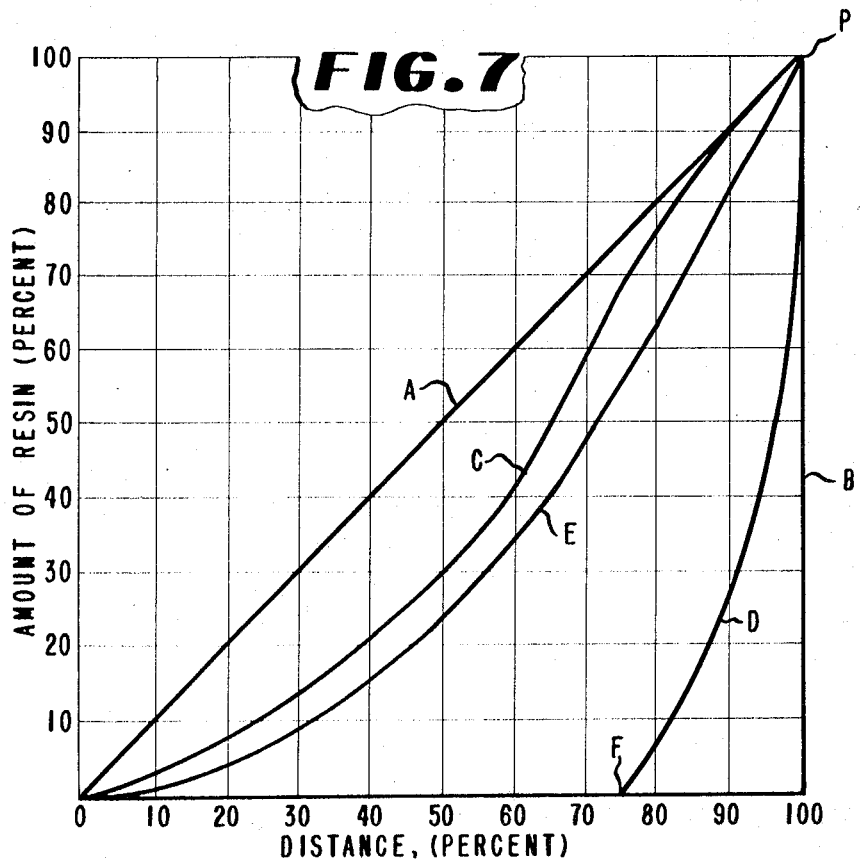

FILLING MATERIAL OF POLYESTER FIBERS

BACKGROUND OF THE INVENTION

This invention relates to fibrous nonwoven articles and, more particularly, to lightweight, resilient, high-bulk materials suitable for cushioning and insulating.

Fibrous materials of natural origin, such as cotton, have long been used as fillings in such articles of commerce as seat cushions, paddings and insulated garments. Because such natural fibers lack a high degree of resilience, it is customary to combine them with metal springs or materials such as foam rubber to compensate for this shortcoming. Crimped synthetic fibers such as polyethylene terephthalate are known to have a very high degree of resilience and, combined with their low cost, mildew resistance, and odor- and allergy-free attributes, they would be expected to give excellent performance as filling materials. Filling materials of synthetic fibers have been produced by methods well known in the art of processing natural fibers including carding or garnetting the staple-length fibers to a web which is cross-lapped to the desired thickness onto a moving apron. Although being soft to the touch, such filling materials lack a high degree of support bulk, i.e., the ability to maintain a high proportion of original thickness under an applied load, and when they are in use in cushioning, their constituent fibers have a tendency to disassociate and the cushion tends to mat after repeated use. More recently, researchers have found that the addition of bonding resin to bond the fibers at their cross-over points in the web produces improved support bulk and prevents the fibers from migrating. It is commercial practice today to cross-lap webs and spread resin on the surface of the layered structure. Because of the improvements realized by the use of bonding resin, researchers have been eager to find methods for thoroughly and uniformly impregnating webs of synthetic fibers so that each and every fiber of the web is covered with resin. Such thoroughly impregnated webs may be made of bi-component fibers, i.e., sheath/core fibers having a core of synthetic polymer and a sheath of another polymer of lower melting-point. Thus, in effect, the sheath is the bonding resin in these structures. Such filling materials made with these thoroughly impregnated webs have a high degree of support bulk but lack softness. Thus, it seemed that softness and support bulk were incompatible and either one or the other could be had, not both. It has now been discovered that both may be attained and the present invention provides a filling material of synthetic fibers having the desirable combination of softness and support bulk.

SUMMARY OF THE INVENTION

This invention provides a bulky, lightweight, resilient, easily compressible, fibrous filling material of density between about 0.003 and 0.04 gm./cc., comprising a bonded laminate of a plurality of thin fibrous webs of crimped linear polyester fibers, each of said thin webs having a gradation of resin concentration on the individual fibers which extends diminishingly from the top web-face to the bottom web-face, i.e., present in diminishing quantities from one face to the other. The majority of fibers within the volume bounded by the length, width and half the depth, (the half depth being one-half of the web thickness measured by a perpendicular from the top web-face) of each of said thin webs are bonded at their cross-over points by a resin and the above described volume contains at least 70 percent, by weight, of the entire amount of resin on the web.

The product is produced by a process by a process wherein a lightweight web of linear polyester fibers is conveyed by a first moving flat surface and continuously discharged therefrom onto a second flat, substantially horizontal, moving surface and stacked or lapped onto said second surface by pendulous movements of said first moving surface. A resinous liquid is applied to the thin web by spraying one of its faces while it is supported by the said second surface, in such a manner as to have a gradation of resin concentration extending diminishingly from the sprayed face to the opposite face, and thereafter curing the resin to bond a substantial number of the constituent fibers at their cross-over points.

BRIEF DESCRIPTION OF THE DRAWINGS

The invention will be better understood by reference to the accompanying drawings wherein, FIG. 4 is a schematic elevational view of a transverse cross-section of a filling material of the prior art subjected to a load, FIG. 5 is a similar view of another structure of the prior art, FIG. 6 is a similar view of a filling material of the present invention, and FIG. 7 is a graph showing a preferred gradation of resin concentration in the practice of the present invention.

DESCRIPTION OF THE PREFERRED EMBODIMENT

Figure 1:
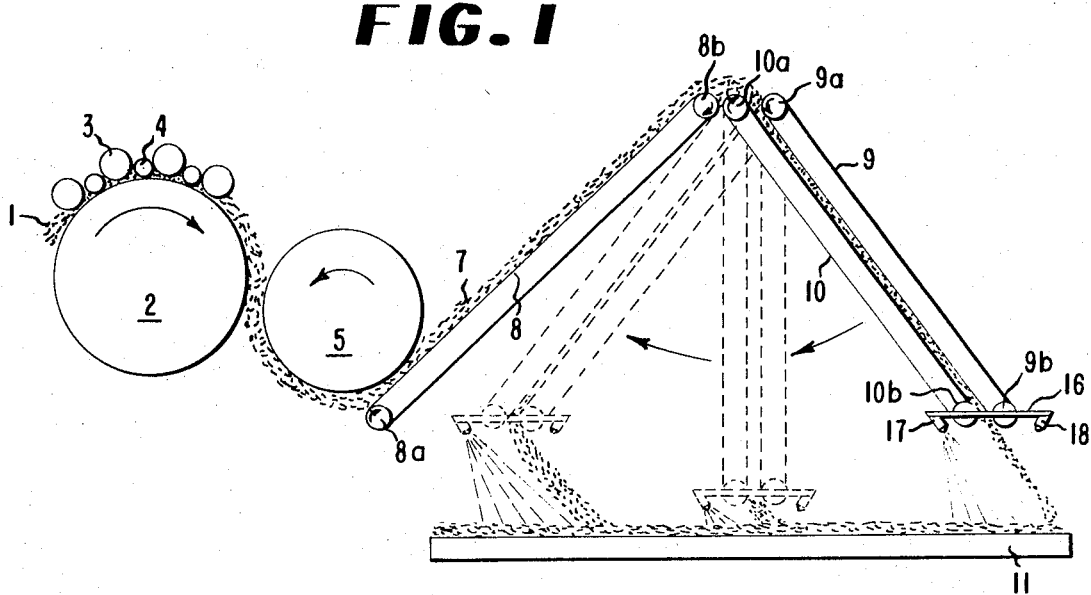
FIGS. 1 and 2 are schematic elevational views of an apparatus used for producing the filling material of the invention showing sequentially the method used in forming a laminate structure.
Figure 2:
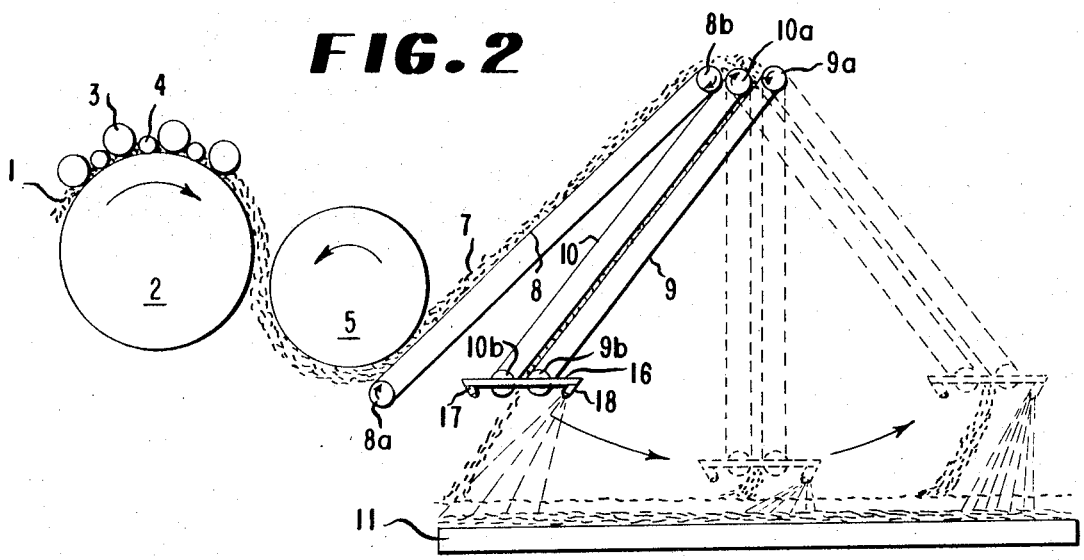

Referring to FIGS. 1 and 2 wherein like parts have been given the same numeral of reference, crimped polyester staple-length fibers 1 are fed to the main cylinder 2 of the carding section of a conventional garnett. They are worked by the worker rolls 3, stripped from the worker rolls and returned to the main cylinder by stripper rolls 4, removed from the main cylinder by conventional doffer roll 5, and transported in web form 7 on traveling apron 8 driven by rollers 8a and 8b. The thin web then passes to the cross-lapper comprising traveling aprons 9 and 10 driven by rollers 9a, 9b, 10a and 10b, respectively. After passing between the aprons, the web is discharged onto flat apron 11 which travels in a direction perpendicular to the plane of the paper. The cross-lapper makes pendulous back- and-forth movements in the direction of the arrows while the web is discharged onto the apron in such a manner that the web is layered or cross-lapped on traveling apron 11. In accordance with the present invention, the cross-lapper is fitted with frame 16 bearing spray nozzles 17 and 18 which connect to a pressurized resin supply and switching means (not shown) for starting and stopping the nozzles in a predetermined manner. Although only two nozzles are shown it is to be understood that more than one nozzle may be used on each side. As the cross-lapper reaches one end of its period, one set of microswitches is activated and turns nozzles 18 off and 17 on, thus as the cross-lapper swings back and forth, nozzles 17 and 18 alternately spray resin onto the laid web. Thus, as shown in FIG. 1, the cross-lapper moves from right to left while spray nozzle 17 sprays resin onto the web laid down by the previous traverse of the cross-lapper and nozzle 18 is off. In FIG. 2, the cross-lapper has just begun to move from left to right and nozzle 17 is off while nozzle 18 sprays resin onto the web laid down by the previous traverse of the cross-lapper. Thus, preferably, the resin is always sprayed ahead of the cross-lapper. In this manner, each thin web is sprayed on one surface and, in accordance with the present invention, there is a gradation of resin concentration extending diminishingly from the sprayed web face to the opposite face.

After the webs are sprayed with resin and stacked as taught hereinabove, the resin is cured. This may be accomplished conveniently in accordance with conventional procedures by passing the structure through an oven by means of a conveyor apron. The temperature is chosen to be consistent with the curing temperatures of the particular resin used. After curing the resin, the nonwoven product may be heated even further to develop more support bulk. It has been found especially when working with helically crimped fibers that an additional heating process at temperatures from 170° to 200° C. for a period from 2–8 minutes produces an extremely high degree of support bulk.

Other well-known methods of making and depositing a thin web in layers on a moving apron may be used.

In the foregoing process, the webs which have been cross-lapped lie flat and have substantially no wrinkles in the layered structure. If the processes of the prior art were modified wherein resin would be sprayed onto the vertical unsupported portion of the web as it issued from the cross-lapper, the polyester fibers, unlike cotton fibers, would fly apart and the web would billow and become disordered. The devices of the prior art even modified as such may be satisfactory with natural fibers such as cotton but with fibers such as staple-length polyester they fail to produce a coherent, flat, resin-impregnated fibrous structure.

The term polyester fibers includes fibers as defined in 1960 "Supplement to Book of ASTM Standards" part 10 at page 53. Linear polyesters useful in the practice of this invention include linear terephthalate polyesters such as polyethylene terephthalate, polyethylene terephthalate/isophthalate, polyethylene terephthalate/5-(sodium sulfo)-isophthalate (97/3), and poly (p-hexahydroxylylene terephthalate). Preferably, the polyester is polyethylene terephthalate.

The term "filling support weight" (FSW) is used herein to define the support-bulk of a nonwoven structure. The meaning of the term will be better understood by reference to the following testing procedure: An unbleached muslin-ticking (commonly used in seat-cushion construction), measuring 22 by 22 by 3.5 inches ($55.9 \times 55.9 \times 8.9$ cm.), is stuffed evenly with some of the filling material to be tested. The cushion is placed on a table top or other flat surface and its thickness (under no load) is measured. A flat, rigid, round disc of 50 square inches ($322.5$ cm.$^2$) surface-area is placed on top of it. Weights are placed on the disc until the total weight of the loaded disc is 62.5 pounds (28.4 kg.). The thickness under load is measured. Filling material is evenly added to or withdrawn from the ticking and the above process is repeated until its thickness under load is just 30 percent of its thickness under no load. At this point, the maximum thickness (thickness under no load) of the filled ticking is at least 4 inches (10.2 cm.), and is preferably 6 to 8 inches (15.2 to 20.3 cm.). The filling is then removed from the ticking and weighed. The weight of the filling is reported as FSW. It is readily seen that a filling material having good support-bulk has low FSW values, while a filling material having poor support-bulk has high FSW values (e.g., greater than 2 pounds).

Crimp frequency is measured according to the following procedure: A sample of crimped fiber is straightened by applying just enough tension to do so. The fiber is marked at intervals of 1 inch (2.54 cm.) while in this condition. The tension is removed and the fiber is allowed to resume its crimped configuration. Crimp frequency is the average number of peaks per marked interval on one side of the helix axis, in the case of coiled fiber. A similar measurement is made in the case of a fiber with sawtooth crimp.

The wet pick-up, i.e., the percent, by weight, of resin emulsion or solution on the web based on the weight of the unimpregnated web, may be from about 20 to 200 percent to insure an adequate resin add-on; i.e., the percent by weight, of non-aqueous (or non-volatile) ingredients in the resin mixture based on the weight of the unimpregnated web, of about 1.5 to about 50 percent.

The fibers used in accordance with the present invention are crimped. The crimp may be the sawtooth variety produced by a stuffer-box crimper shown in U.S. Pat. No. 2,311,174. Preferably, however, the fibers are crimped in helical configuration as described in U.S. Pat. No. 3,050,821 and processed as shown in U.S. Pat. No. 3,414,648. The fibers have a crimp frequency of from about 4 to 30 crimps per inch (per 2.54 cm.), and may have a denier of from about 1 to 40. Preferably, the crimp frequency is about 9 crimps per inch (per 2.54 cm.) and the denier is about 4.

The resins used in accordance with the present invention may be chosen from the acrylics, melamines, polyvinylchlorides, polyvinylacetates, polyesters, polyurethanes, ethylene copolymers and others. Preferably the resin is an aqueous emulsion comprising ethyl acrylate, methylmethacrylate N-methylolmethacrylamide, methacrylic acid and a cross-linking agent. Other additions may be included such as silicones to confer additional softness to the fibers. Flame retardant resin systems such as polyvinylchloride with tris 2,3-dibromopropylphosphate may be used.

It is important that the fiber and the resin be chosen so that a "wicking" effect, wherein by capillary action or a similar wetting phenomenon, the resin is drawn into and through the web to effect uniform distribution of resin throughout the thickness of the web, is avoided. Cotton fibers produce the undesirable wicking effect.

The new fibrous filling material may be produced in any length, width, or thickness. Usually from about 4 to about 70 and preferably about 12 layers of web are used to make up the new structures, each layer before impregnation being of density from about 0.0008 to 0.01 g./cc. Each thin web, before impregnation with resin, may be from 0.04 to 0.15 ounce per ft.$^2$ (1.22–4.57 mg./cm.$^2$) weight and is preferably 0.08 to 0.13 ounce per ft.$^2$ (2.44 to 3.96 mg./cm.$^2$). The density of the new fibrous structure may be from about 0.003 to 0.04 g./cc.

Contrary to teachings of the prior art where uniform resin penetration through the webs was desired, it has now been found, surprisingly, that a gradation of resin concentration is desirable not only for a high degree of support bulk but for aesthetic qualities such as softness of non-woven structures to be used as filling materials. This may be seen in FIGS. 4–6, which are explained later in Example II.

The distribution of resin in a web may be determined by cutting an individual web from the laminated structure. This web is then bisected by cutting through the plane running through the center of its thickness. The amount of resin present in each portion may be determined by dissolving the resin and weighing it, or dissolving the fiber and weighing it and subtracting this from the total weight of the resin-impregnated web. Alternately, the amount of resin may be determined by visual inspection of photomicrographs of the cross-section of the web to be analyzed. Use of colored dye in the resin composition facilitates this determination. Similarly, the amount of resin in any volume of the web may be measured once the required volume is separated from the web.

Figure 3:
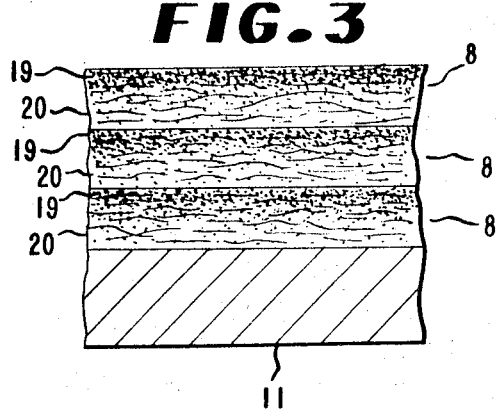
FIG. 3 is a schematic elevational view of a transverse cross-section of the new filling material.

The filling material of the present invention, composed of layered webs 8 (FIG. 3), has on one side of the interface between the layered webs an area containing fibers which are heavily coated with resin and on the other side an area containing fibers which contain less resin. FIG. 3 shows a structure of the present invention wherein webs 8 are shown stacked one on top of the other, each web having an area 19 near said interface which is coated heavily with resin and an area 20 which contains less resin. Contrary to prior art methods in which thorough resin-impregnation of webs is desired, such is not desired in the practice of this invention. In the prior art, especially in using cellulosic fibers, it was found that the recovery properties of these fibers are improved by using a resin which would cross-link the cellulosic molecules. Thus, it was important that each and every fiber in the web be contacted with the "cross-linking" resin and, obviously, thorough impregnation of the web with resin was desirable. In the product of the present invention, it is important that there be a gradation of resin on each constituent web.

The preferred gradation of resin concentration is shown in FIG. 7. This is a graph showing the distribution of resin in an individual web of a composite filling material. The ordinate shows the cumulative amount of resin, in weight percent, in the various sections marked on the abcissa which shows distance in percent from the bottom (0 percent) face to the top face (sprayed face) of the web. A completely uniform distribution of resin from bottom to top with no gradation of concentration, such as occurs in products of the prior art, would be represented by line A while a web containing resin on its top face as a surface layer only, there being no resin penetration into the web, would be represented by the line B. In accordance with the present invention, the resin distribution falls within the area bounded by curves C and D, i.e., OCPDF. Preferably, the distribution follows curve E. Thus, the volume bounded by the length, width and half depth, the half depth being one-half of the web thickness measured by a perpendicular from the top web face (sprayed face) contains at least 70 percent of the total weight of resin on the web.

In preparing the new filling material, the individual webs are stacked one on top of the other. For illustration, the face of an individual web, which contains the greatest amount of resin (sprayed face) will be called "A" and the opposite face will be called "B." In stacking the webs on top of each other to make the new filling material, it is preferred to have an ABAB arrangement although other arrangements such as ABBA are within the scope of the present invention. An additional resin coating of the complete structure may also be made.

The invention is further illustrated by the following examples of preferred embodiments which are not intended to be delimitative.

EXAMPLE I

Approximately 200 pounds (91 kg.) of commercially available, 2.0 in. (5.1 cm.), 4.25-denier-per-filament polyethylene terephthalate staple having a crimp frequency of approximately 9.5 crimps per inch (per 2.54 cm.) and containing about 0.3 percent, by weight, $TiO_2$ is produced substantially as taught in U.S. Pat. No. 3,414,648 and fed to a conventional double-doffer garnett. The garnett is set to produce a 0.09 oz./ft.$^2$ (2.7 mg./cm.$^2$) web at the rate of 125 lbs./hr. (57 kg./hr.) and feeds to a cross-lapper. The machinery is arranged substantially as shown in FIG. 1. The thin web, which is about 60 inches (152.4 cm.) wide, and of about 0.125 lbs./ft.$^3$ (0.002 g./cm.$^3$) density, discharges from the cross-lapper, which swings back and forth, onto apron 11 which travels in a direction parallel to the plane of the web in the cross-lapper at approximately 10 ft./min. (3.05 meters/min.) The web discharges from the cross-lapper at an angle with respect to the apron to form a 45-inch (114 cm.) filling material. The web is sprayed by resin from eight spray guns, four on each side of the cross-lapper and each discharging resin toward the apron and onto the laid webs as shown in the drawings. The spray guns spray the web ahead of the cross-lapper, and, as described above, the spray guns spray alternately. The orifice of each nozzle is about 0.026 inch (0.066 cm.) in diameter and the supply pressure is about 60 psig (4,218 g./cm.$^2$). Each nozzle is designed to spray resin in a fan-like pattern 15-inches (38.1 cm.) wide onto the web. Thus, four nozzles cover the 60-inch wide (152.2 cm.) web that advances onto the floor apron. The wet pick-up of resin is about 65 percent and the resin add-on is about 15 percent. The resin composition comprises a 23 percent aqueous emulsion comprising 46-parts of ethylacrylate, 48-parts methylmethacrylate, 47-parts N-methylolmethacrylamide, 1-part methacrylic acid and a cross-linking agent. A transverse cross-section of the layered fibrous structure contains 10 layers of the thin webs, each layer having a gradation of resin concentration through its thickness so that the fibers within the volume bonded by the length, width and half depth, the half depth being one-half the web thickness measured by a perpendicular from the sprayed face of each thin web is coated with resin at the fiber cross-over points and contains about 75 percent, by weight, of the entire amount of resin on the thin web.

The structure is dried in an oven at approximately 196° C. for 2 minutes. The resulting structure is bulky, soft, resilient, lightweight and has a density of about 0.41 lbs./ft.$^3$ (0.0066 g./cm.$^3$).

The laminated fibrous structure is then heated at approximately 196° C. for 4 minutes and is shown to have a surprising amount of softness, support bulk, and resilience, a combination unequalled by any wholly fibrous filling material known today. The product has an FSW of about 1.80 pounds (0.82 kg.). Fibrous filling materials of the prior art with similar softness have FSW values of about 2.2 pounds (1 kg.), or more.

EXAMPLE II

This example shows two filling materials of the prior art and compares these with a filling material produced substantially as shown in Example I, in regard to conformability.

Reference will be made to FIGS. 4–6 to describe the bulk and softness tests of the filling materials of this example.

A fibrous filling material is produced substantially as shown in Example I with the exception that no binder resin is used and there are eight layers of the webs instead of 10 layers. No heat treatment is performed. Six of these layered materials (8' in FIG. 4) are stacked one on top of the other to make a filling material comprising 48 layers of thin webs. A solid brass cylinder 20 measuring 4 inches (10.2 cm.) in diameter by 1.25 inch (3.18 cm.) in height is placed on a flat bench top 21. A sample of the filling material measuring 11 × 22 inches (27.9 × 55.9 cm.) is placed on the cylinder and a 1-inch (2.54 cm.)-thick flat board 22 measuring 12 by 24 inches (30.5 × 61 cm.) is placed on top of the filling material. A 12.4-pound (5.73 kg.) weight is placed on the board. The filling material conforms to the shape of the cylinder substantially as shown in FIG. 4 where it is apparent that the open space 23 between the cylinder and the first layer of web, is small. Because no heat treatment is used and because no resin binder is used, this filling material has poor support bulk. Heat treatment such as performed in the previous example would cause an increase of thickness under the load, of about 50 percent.

Another fibrous filling material is produced substantially as described in the preceding paragraph and tested for conformability in the same manner. The fibers of this filling material are composed of two polymers intimately adhered along their length in concentric sheath/core relationship, the polymer making up the core being polyethylene terephthalate, the polymer making up the sheath being poly(ethylene terephthalate/isophthalate) (79/21) having a lower melting point than the core component, the fiber being composed of 85 weight percent polyethylene terephthalate and 15 weight percent poly(ethylene terephthalate/isophthalate) (79/21). The fibers are 2.5 inches (6.35 cm.) long, of 4.2 denier per filament and have a sawtooth crimp of 7.3 crimps per inch (per 2.54 cm.). In preparing this filling structure, after the thin webs issue from the cross-lapper and are cross-lapped to make up the layered structure, the structure is heat treated at approximately 232° C. for approximately 2 minutes to bond some of the fibers at their cross-over points and given another heat treatment at the same temperature for 8 minutes. The thickness of the layered filling material is approximately the same as the thickness of the filling material of the preceding paragraph. This is a filling material of the prior art. The filling material is tested for conformability in the same manner with the same load, as stated in the preceding paragraph and as shown in FIG. 5, although it has a high degree of support bulk, it conforms to the shape of the cylinder relatively poorly as shown by large area 23 as compared to the showing of FIG. 4.

Another filling material is produced substantially as shown in Example I and tested in the same manner as the filling materials of the preceding paragraphs. This web, being produced in accordance with the present invention, shows a high level of conformability and a high level of support bulk, substantially as illustrated in FIG. 6. Area 23 is small showing the structure is conformable to the shape of an exterior object. In addition to this, the structure supports the load nearly as well as the structure of FIG. 5. Furthermore, another advantage of the present invention and a surprising phenomenon is apparent in FIG. 6. The individual webs of the laminate, which are closest to block 20, are compressed more than those which are farthest from block 20. The advantage of this in a filling material can be appreciated by visualizing a sleeping bag having a stick or stone underneath. The user would not be as much annoyed by the presence of the object, i.e., its presence would not be transmitted through each layer of web as it would be with materials of the prior art.

What is claimed is:

1. A filling material comprising: a plurality of webs of crimped linear condensation polyester fibers, said fibers being intermingled and interlocked at cross-over points, said webs having spaced faces, a density of from about 0.003 to about 0.04 grams per cubic centimeter, and a filling support weight of about 1.8 pounds, said fibers being bonded at said cross-over points by a cured resin, said resin being present in diminishing quantities through each web from one to the other face, about 75 percent of said resin being contained in one-half the thickness of each web as measured from said one face.

2. The filling material of claim 1, and said webs forming a layered structure, said one and said other faces of adjacent webs being contiguous.

* * * * *